United States Patent
Books et al.

(10) Patent No.: US 12,344,259 B2
(45) Date of Patent: Jul. 1, 2025

(54) DYNAMIC ACCELERATOR RESPONSE MANAGEMENT FOR A VEHICLE

(71) Applicant: Cummins Inc., Columbus, IN (US)

(72) Inventors: Martin T. Books, Columbus, IN (US); Vivek Anand Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/427,762

(22) Filed: Jan. 30, 2024

(65) Prior Publication Data

US 2024/0166217 A1     May 23, 2024

Related U.S. Application Data

(63) Continuation of application No. 16/625,331, filed as application No. PCT/US2018/039249 on Jun. 25, 2018, now Pat. No. 11,926,331.

(Continued)

(51) Int. Cl.
*B60W 50/00*     (2006.01)

(52) U.S. Cl.
CPC ..... *B60W 50/00* (2013.01); *B60W 2050/0088* (2013.01)

(58) Field of Classification Search
CPC ...... B60W 50/00; B60W 50/08; B60W 50/10; B60W 10/06; B60W 30/18027; B60W 30/18036; B60W 30/18063; B60W 30/18072; B60W 30/18109; B60W 2050/0026; B60W 2050/0088; B60W 2540/10; B60W 2554/00; B60W 2554/80;

(Continued)

(56) References Cited

U.S. PATENT DOCUMENTS 6,125,314 A    9/2000   Graf et al.
6,830,532 B1   12/2004  Gebby et al.
(Continued)

FOREIGN PATENT DOCUMENTS

CN          105946560      9/2016
DE       10 2012 204 718   9/2013
(Continued)

OTHER PUBLICATIONS

Csaba Tóth-Nagy, The Development of a Fourth Generation Hybrid Electric Vehicle at West Virginia University, Mar. 8, 2001, SAE the Engineering Society for Advancing Mobility Land Sea Air and Space, SAE 2001 World Congress (Year: 2001).

(Continued)

*Primary Examiner* — Grant Moubry
(74) *Attorney, Agent, or Firm* — Foley & Lardner LLP

(57) ABSTRACT

A method includes receiving an indication regarding a deceleration event for a vehicle, remapping a response of a prime mover of the vehicle from following a first response curve to following a deceleration response curve in response to (i) the deceleration event and (ii) a speed of the vehicle being greater than a speed threshold, and activating an output of the prime mover to accelerate the vehicle at a relatively lesser amount of depression of an accelerator from a non-depressed state of the accelerator than prior to the deceleration event in response to the accelerator being engaged by an operator following the deceleration event.

20 Claims, 7 Drawing Sheets

Related U.S. Application Data

(60) Provisional application No. 62/524,893, filed on Jun. 26, 2017.

(58) Field of Classification Search
CPC ......... B60W 2556/50; B60W 2520/10; B60W 2710/0666; B60K 5/08; B60K 17/04
See application file for complete search history.

(56) References Cited

U.S. PATENT DOCUMENTS

| | | | |
|---|---|---|---|
| 6,854,539 B2 | 2/2005 | Lewis | |
| 7,288,047 B1 | 10/2007 | Hitt et al. | |
| 7,295,918 B2 | 11/2007 | Nada | |
| 7,641,588 B2 | 1/2010 | Thomson et al. | |
| 7,848,859 B2 * | 12/2010 | Homeyer | F02D 41/2474 123/297 |
| 8,843,286 B2 | 9/2014 | Tezuka et al. | |
| 9,315,189 B2 * | 4/2016 | Mould | B60W 20/11 |
| 9,352,741 B2 * | 5/2016 | Wise | B60W 10/184 |
| 9,914,454 B2 | 3/2018 | Simmons et al. | |
| 2009/0111641 A1 | 4/2009 | Kim et al. | |
| 2012/0150384 A1 * | 6/2012 | Jung | B60W 50/14 701/31.1 |
| 2013/0049942 A1 * | 2/2013 | Kim | B60W 20/00 701/22 |
| 2013/0291830 A1 | 11/2013 | Doering et al. | |
| 2015/0051046 A1 | 2/2015 | Wise et al. | |
| 2015/0166048 A1 * | 6/2015 | Herrmann | B60W 20/30 180/65.265 |
| 2015/0224845 A1 | 8/2015 | Anderson et al. | |
| 2015/0321671 A1 | 11/2015 | Simmons et al. | |
| 2017/0298811 A1 | 10/2017 | Santillo et al. | |
| 2018/0203461 A1 | 7/2018 | Yokokawa et al. | |
| 2018/0208175 A1 | 7/2018 | Zhang et al. | |
| 2018/0361972 A1 | 12/2018 | Zagorski | |
| 2021/0403006 A1 | 12/2021 | Books et al. | |

FOREIGN PATENT DOCUMENTS

| | | |
|---|---|---|
| EP | 1 688 329 | 12/2008 |
| JP | 2008-051152 A | 3/2008 |

OTHER PUBLICATIONS

Examination report dtd Sep. 14, 2022 re Appl No. GB2000037.8.
Examination Report for United Kingdom Application No. GB 2000037.8 mailing date Jun. 6, 2022, 2 pages.
Final Office Action on U.S. Appl. No. 16/625,331 DTD Nov. 21, 2022.
Foreign Action other than Search Report on CN 201880043204.X Dtd May 26, 2022.
Foreign Action other than Search Report on GB 2000037.8 Dtd Dec. 8, 2021.
Foreign Action other than Search Report on GB 2000037.8 Dtd Mar. 4, 2022.
Foreign Action other than Search Report on PCT PCT/US2018/039249 Dtd Jan. 9, 2020.
International Search Report and Written Opinion for International Application No. PCT/US2018/039249, mail date Aug. 30, 2018, 9 pages.
Jianjun Hu, A torque compensation strategy in two-speed automated mechanical transmission shift process for pure electric vehicles, Oct. 2015, Advances in Mechanical Engineering, vol. 7(11) 1-11 (Year: 2015).
Non-Final Office Action on U.S. Appl. No. 16/625,331 Dtd Mar. 22, 2022.
Non-Final Office Action on U.S. Appl. No. 16/625,331 Dtd Jun. 9, 2023.
Non-Final Office Action on U.S. Appl. No. 16/625,331 Dtd Aug. 2, 2022.
Notice of Allowance on U.S. Appl. No. 16/625,331 Dtd Oct. 30, 2023.
US Office Action on U.S. Appl. No. 16/625,331 Dtd Nov. 2, 2021.

* cited by examiner

DYNAMIC ACCELERATOR RESPONSE MANAGEMENT FOR A VEHICLE

CROSS-REFERENCE TO RELATED PATENT APPLICATIONS

This application is a continuation of U.S. patent application Ser. No. 16/625,331, filed Dec. 20, 2019, which is a National Stage filing of International Application No. PCT/US2018/039249, filed Jun. 25, 2018, which claims the benefit of U.S. Provisional Application No. 62/524,893, filed Jun. 26, 2017, all of which are incorporated herein by reference in their entireties.

TECHNICAL FIELD

The present disclosure relates to dynamic accelerator response management for a vehicle. More particularly, the present disclosure relates to dynamically remapping an associated response of a prime mover of a vehicle based on a position of an accelerator of the vehicle in response to a remapping condition.

BACKGROUND

The response of a prime mover (e.g., an engine, a motor, etc.) of a vehicle may be based on the position of an accelerator pedal or throttle. Typically the response is a static or near static accelerator response profile such that the demanded torque/power from the prime mover remains fairly consistent based on a single look-up table (or similar mechanism) as a function of the input accelerator position. Such a static or near static response may lead to inefficient operation under various conditions, especially in hybrid and electric vehicles.

SUMMARY

One embodiment relates to a non-transitory computer readable medium having computer-executable instructions encoded therein. The instructions, when executed by one or more processors, cause the one or more processors to perform operations including receiving an indication regarding a deceleration event for a vehicle based on at least one of an accelerator being disengaged by an operator or a brake being engaged by the operator and remapping a response of a prime mover of the vehicle from following a normal response curve to following a deceleration response curve in response to the deceleration event. The prime mover is configured to provide a negative torque response and a positive torque response with a zero torque operating condition between the negative torque response and the positive torque response where (a) a first slope of the negative torque response for the deceleration response curve is greater than a second slope of the negative torque response for the normal response curve and (b) a first range of the zero torque operating condition for the deceleration response curve is smaller than a second range of the zero torque operating condition for the normal response curve, thereby reducing an overall range of the accelerator that is associated with the negative torque response and the zero torque operating condition.

Another embodiment relates to a non-transitory computer readable medium having computer-executable instructions encoded therein. The instructions, when executed by one or more processors, cause the one or more processors to perform operations including monitoring a speed of a vehicle, receiving an indication regarding a deceleration event for the vehicle based on at least one of an accelerator being disengaged by an operator or a brake being engaged by the operator, and remapping a response of a prime mover of the vehicle from following a normal response curve to following a deceleration response curve in response to (i) the deceleration event and (ii) the speed of the vehicle being greater than a speed threshold. The speed threshold is three miles per hour or more. In response to the accelerator being engaged by the operator following the deceleration event, an output of the prime mover to accelerate the vehicle activates at a relatively lesser amount of depression of the accelerator from a non-depressed state of the accelerator than prior to the deceleration event.

Still another embodiment relates to a method. The method includes receiving an indication regarding a deceleration event for a vehicle, remapping a response of a prime mover of the vehicle from following a normal response curve to following a deceleration response curve in response to (i) the deceleration event and (ii) a speed of the vehicle being greater than a speed threshold, and activating an output of the prime mover to accelerate the vehicle at a relatively lesser amount of depression of an accelerator from a non-depressed state of the accelerator than prior to the deceleration event in response to the accelerator being engaged by an operator following the deceleration event.

These and other features, together with the organization and manner of operation thereof, will become apparent from the following detailed description when taken in conjunction with the accompanying drawings.

DETAILED DESCRIPTION

Figure 1:
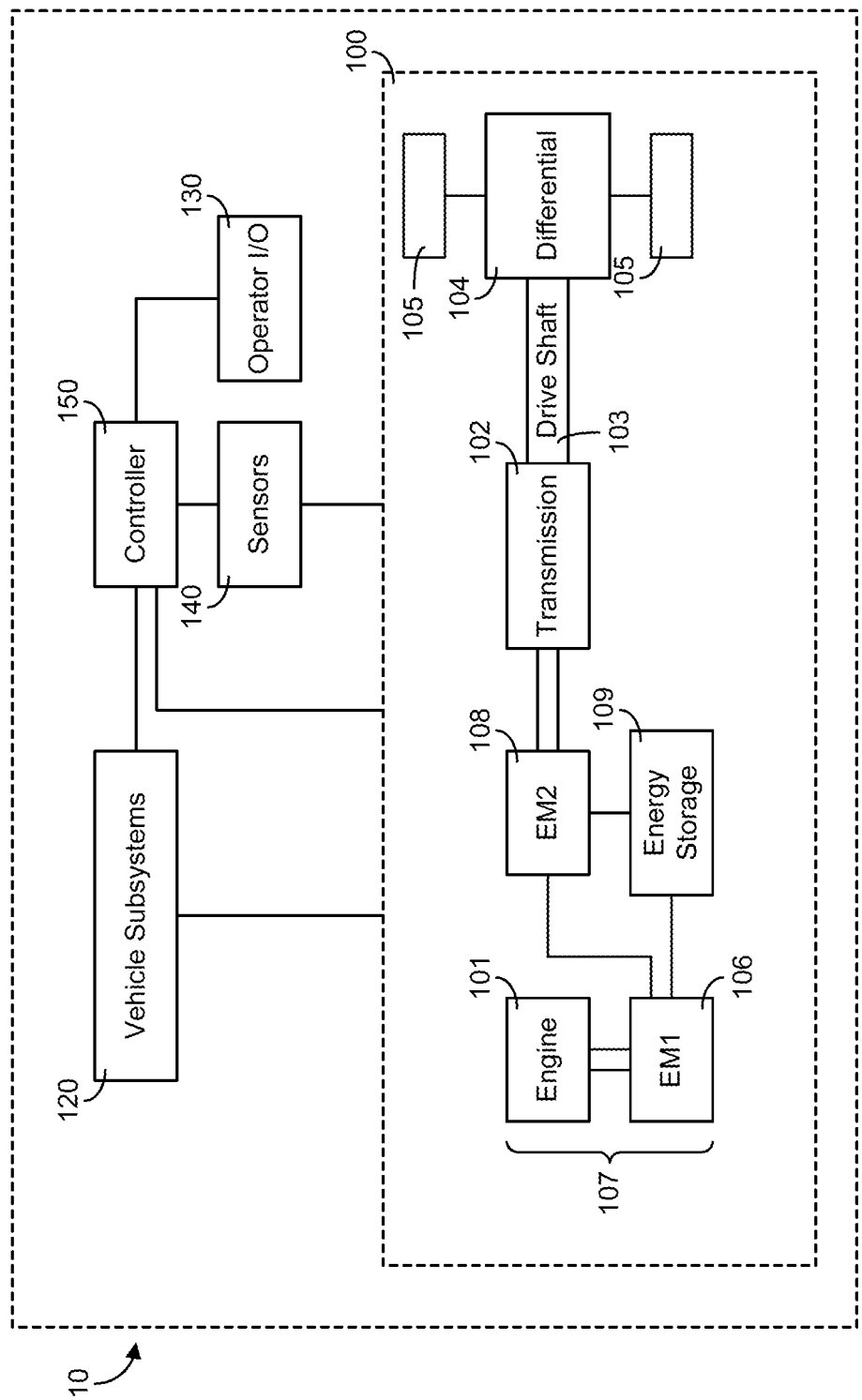
FIG. 1 is a schematic diagram of a vehicle having a series hybrid powertrain and a controller, according to an example embodiment.

Following below are more detailed descriptions of various concepts related to, and implementations of, methods, apparatuses, and systems for dynamic accelerator pedal/throttle response management and/or brake pedal/lever response management for a vehicle. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for dynamic accelerator pedal/throttle response management and/or brake pedal/lever response management for a vehicle, and more specifically, remapping accelerator pedal/throttle response and/or brake pedal/lever response in response to and based on one or more remapping conditions. Conventional/traditional internal combustion engine (e.g., diesel, gasoline, etc.) propulsion powertrains typically have static (or near static) accelerator response profiles. In other words, the demanded torque/power from the primary power plant (e.g., a device that is mechanically coupled to the wheels, etc.) remains fairly consistent based on a single look-up table (or similar mechanism) as a function of the input accelerator position (e.g., accelerator pedal, throttle, etc.). For example, a common implementation is a table that provides a percentage of maximum torque as an output with respect to the input of accelerator position. This may also be manifested with acceleration based speed (ABS) and acceleration based torque (ABT) tables. Often times the transmission system acts as an intermediary between the engine and the driveline to provide a variation to the driveline torque as a function of load (e.g., accelerator pedal position, throttle position, etc.) and speed (e.g., transmission output, engine output, etc.). Some of the characteristics in terms of the engine output torque as a function of the accelerator position are an artifact of the engine characteristics. For example, an engine coupled to a torque converter/automatic transmission at full stop produces a specific amount of torque to maintain idle speeds while overcoming torque converter resistance. When the brakes are released, this engine output torque is amplified through the torque converter to provide a vehicle launch torque response even when the accelerator has not been depressed or otherwise engaged. This characteristic can be readily changed as a function of a torque converter K-factor or stiffness. The vehicle may accelerate at different rates depending upon a number of additional factors such as current road grade, vehicle mass, rolling resistance, powertrain component inertias, gear ratios, etc.

When migrating from conventional vehicle powertrains to either hybrid powertrain systems or electric vehicle (EV) architectures, an electric motor and not an engine, is mechanically coupled to the wheels. A transmission interface may or may not exist (e.g., depending upon the architecture, etc.). A motor does not need to maintain a positive speed "idle" state like an engine. Rather, a motor can produce torque at zero speed unlike an engine. For such system architectures, the traditional framework of the accelerator position response is not sufficient to maximize performance and fuel economy. Applicant has discovered certain expected behavior opportunities (e.g., remapping conditions, etc.) that a dynamic (or variable) accelerator response may lend itself to including (i) vehicle creep operation, (ii) curb climbing situations, (iii) dynamic braking/deceleration with varying traffic conditions, and (iv) vehicle reverse motion. Such dynamic accelerator response for the various remapping conditions is described herein in further detail.

Figure 2:
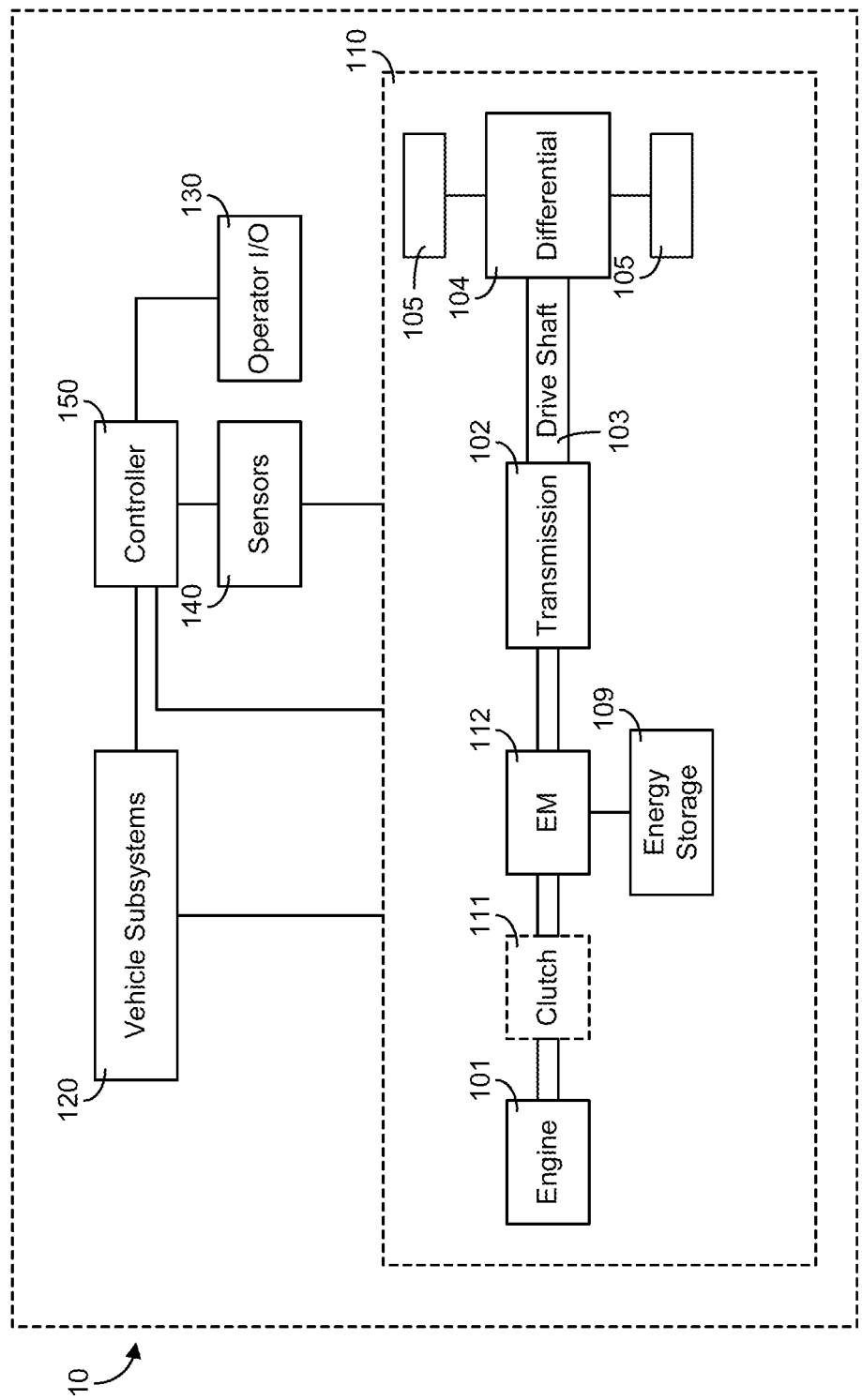
FIG. 2 is a schematic diagram of a vehicle having a parallel hybrid powertrain and a controller, according to an example embodiment.
Figure 3:
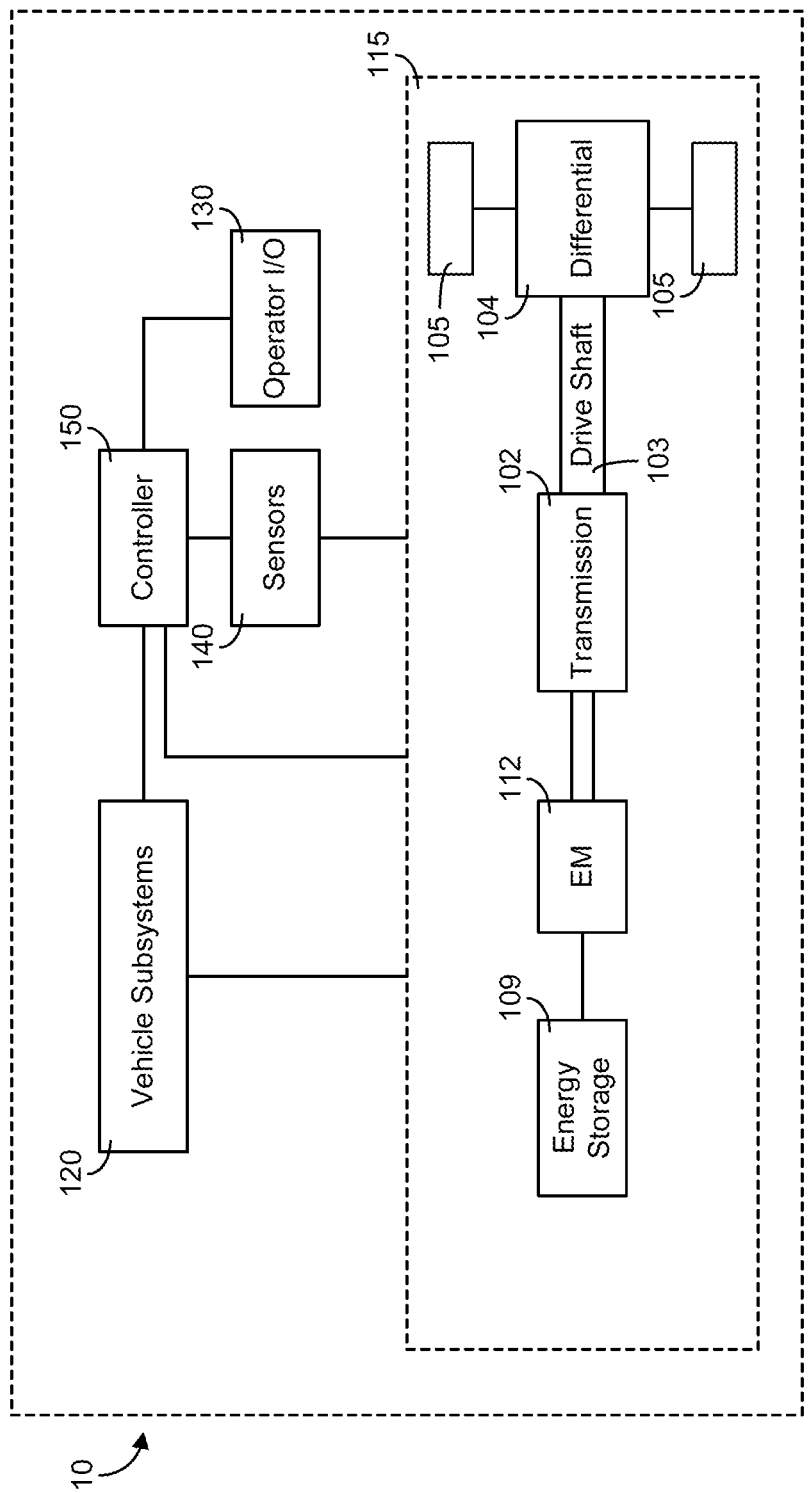
FIG. 3 is a schematic diagram of a vehicle having a full electric powertrain and a controller, according to an example embodiment.

Referring now to FIGS. 1-3, schematic diagrams of a vehicle 10 with a controller 150 are shown according to example embodiments. As shown in FIG. 1, the vehicle 10 generally includes a powertrain 100, vehicle subsystems 120, an operator input/output (I/O) device 130, sensors 140 communicably coupled to one or more components of the vehicle 10, and a controller 150. As shown in FIG. 2, the vehicle 10 includes a powertrain 110 in place of the powertrain 100 of FIG. 1. As shown in FIG. 3, the vehicle 10 includes a powertrain 115 in place of the powertrain 100 of FIG. 1 and the powertrain 110 of FIG. 2. These components are described more fully herein. According to an example embodiment, the powertrain 100 of the vehicle 10 is structured as a series hybrid powertrain, the powertrain 110 of the vehicle 10 is structured as a parallel hybrid powertrain, and the powertrain 115 of the vehicle 10 is structured as a full electric powertrain. In some embodiments, the powertrain 100 and/or the powertrain 110 of the vehicle 10 are structured as another type of hybrid powertrain. In some embodiments, the powertrain 100, the powertrain 110, and/or the powertrain 115 are structured as a conventional, non-hybrid, non-electric powertrain. The vehicle 10 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. Thus, the present disclosure is applicable with a wide variety of implementations.

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 150 is communicably coupled to the systems and components in the vehicle 10 of FIG. 1, the controller 150 is structured to receive data regarding one or more of the components shown in FIG. 1. For example, the data may include operation data regarding the operating conditions of the powertrain 100, the powertrain 110, the powertrain 115, and/or other components (e.g., a battery system, a motor, a generator, a regenerative braking system, an engine, etc.) acquired by one or more sensors, such as sensors 140. As another example, the data may include an input from operator I/O device 130. The controller 150 may determine how to control the powertrain 100, the powertrain 110, and/or the powertrain 115 based on the operation data.

As shown in FIG. 1, the powertrain 100 (e.g., a series hybrid powertrain, etc.) includes an engine 101, a transmission 102, a driveshaft 103, a differential 104, a final drive 105, a first electromagnetic device 106 (e.g., a generator, a motor-generator, etc.), a second electromagnetic device 108 (e.g., a motor, a motor-generator, etc.), and an energy storage device 109. The engine 101 may be structured as any engine type, including a spark-ignition internal combustion engine, a compression-ignition internal combustion engine, and/or a fuel cell, among other alternatives. The engine 101 may be powered by any fuel type (e.g., diesel, ethanol, gasoline, natural gas, propane, hydrogen, etc.). Similarly, the transmission 102 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 102 may include a variety of settings (gears, for a geared transmission) that affect different output speeds based on an input speed received thereby (e.g., from the second electromagnetic device 108, etc.) Like the engine 101 and the transmission 102, the driveshaft 103, the differential 104, and/or the final drive 105 may be structured in any configuration dependent on the application (e.g., the final drive 105 is structured as wheels in an automotive application and a propeller in a boat application, etc.). Further, the driveshaft 103 may be structured as any type of driveshaft including, but not limited to, a one-piece, two-piece, and a slip-in-tube driveshaft based on the application.

As shown in FIG. 1, the engine 101 and the first electromagnetic device 106 are mechanically coupled together (e.g., via a shaft, a gear box, etc.) to form a genset 107. In some embodiments, the first electromagnetic device 106 is a single device having both generating and motoring capabilities. In some embodiments, the first electromagnetic device 106 has only generating capabilities. According to an example embodiment, the engine 101 is structured to drive the first electromagnetic device 106 to generate electrical energy. As shown in FIG. 1, the first electromagnetic device 106 is electrically coupled to the energy storage device 109 such that the first electromagnetic device 106 may provide energy generated thereby to the energy storage device 109 for storage. In some embodiments, the first electromagnetic device 106 is structured to receive stored electrical energy from the energy storage device 109 to facilitate operation thereof. By way of example, the first electromagnetic device 106 may receive stored electrical energy from the energy storage device 109 to facilitate starting the engine 101.

As shown in FIG. 1, the second electromagnetic device 108 is mechanically coupled to the transmission 102 (e.g., via a shaft, a gear box, etc.). In some embodiments, the second electromagnetic device 108 is a single device having both generating and motoring capabilities. In some embodiments, the second electromagnetic device 108 has only motoring capabilities. As shown in FIG. 1, the second electromagnetic device 108 is electrically coupled to the first electromagnetic device 106 and the energy storage device 109 such that the second electromagnetic device 108 may receive energy stored by the energy storage device 109 and/or generated by the first electromagnetic device 106 to facilitate operation thereof. By way of example, the second electromagnetic device 108 may receive stored electrical energy from the energy storage device 109 and/or generated electrical energy from the first electromagnetic device 106 to facilitate providing a mechanical output to the transmission 102. In some embodiments, the second electromagnetic device 108 is structured to generate electrical energy for storage in the energy storage device 109. By way of example, the second electromagnetic device 108 may be structured to utilize a negative torque supply to perform energy regeneration (e.g., when the torque demand therefrom is zero, during engine braking, while the vehicle 10 is coasting down a hill, etc.).

According to an example embodiment, the energy storage device 109 includes one or more batteries (e.g., high voltage batteries, a lead-acid battery, a lithium-ion battery, etc.), one or more capacitors (e.g., super capacitors, etc.), and/or any other energy storage devices, or combination thereof. As shown in FIG. 1, the energy storage device 109 is electrically coupled to the first electromagnetic device 106 and the second electromagnetic device 108. In some embodiments, the energy storage device 109, the first electromagnetic device 106, and/or the second electromagnetic device 108 are electrically coupled to one or more of the vehicle subsystems 120 (e.g., a regenerative braking system, electrically-powered vehicle accessories, etc.). According to the example embodiment shown in FIG. 1, the energy storage device 109 is structured to store electrical energy (i) received from a charging station (e.g., a vehicle charging station, etc.), (ii) generated by the first electromagnetic device 106, (iii) generated by the second electromagnetic device 108, and/or (iv) generated by a regenerative braking system. The energy storage device 109 may be structured to provide the stored electrical energy to (i) the vehicle subsystems 120 to operate various electrical based components of the vehicle 10 (e.g., while the engine 101 is running, while the engine 101 is off, etc.), (ii) the first electromagnetic device 106 to start the engine 101 (e.g., in response to a restart command after a stop-start feature turns off the engine 101, when an operator keys on the engine 101, etc.), and/or (iii) the second electromagnetic device 108 to facilitate providing a mechanical output to the transmission 102 (e.g., to drive the vehicle 10, etc.).

As shown in FIG. 2, the powertrain 110 (e.g., a parallel hybrid powertrain, etc.) includes the engine 101, the transmission 102, the driveshaft 103, the differential 104, the final drive 105, the energy storage device 109, and an electromagnetic device 112 (e.g., a motor-generator, etc.). The powertrain 110 optionally includes a clutch 111 positioned between the engine 101 and the electromagnetic device 112. The clutch 111 is structured to facilitate selectively decoupling the engine 101 from the electromagnetic device 112. In some embodiments, the powertrain 100 of FIG. 1 includes a clutch positioned to selectively mechanically couple the first electromagnetic device 106 with the second electromagnetic device 108 and/or the transmission 102. In such an embodiment, the powertrain 100 having a clutch may be selectively reconfigurable between a series hybrid powertrain and a parallel hybrid powertrain.

As shown in FIG. 2, the engine 101 and the electromagnetic device 112 are mechanically coupled together (e.g., via a shaft, a gear box, the clutch 111, etc.). In some embodiments, the electromagnetic device 112 is a single device having both generating and motoring capabilities. According to an example embodiment, the engine 101 is structured to drive the electromagnetic device 112 to generate electrical energy. As shown in FIG. 2, the electromagnetic device 112 is electrically coupled to the energy storage device 109 such that the electromagnetic device 112 may provide energy generated thereby to the energy storage device 109 for storage. In some embodiments, the electromagnetic device 112 is structured to receive stored electrical energy from the energy storage device 109 to facilitate operation thereof. By way of example, the electromagnetic device 112 may receive stored electrical energy from the energy storage device 109 to facilitate starting the engine 101.

As shown in FIG. 2, the electromagnetic device 112 is mechanically coupled to the transmission 102 (e.g., via a shaft, a gear box, etc.). The electromagnetic device 112 may receive energy stored by the energy storage device 109 and/or mechanical energy from the engine 101 to facilitate providing a mechanical output to the transmission 102. In some embodiments, the electromagnetic device 112 is structured to generate electrical energy for storage in the energy storage device 109 in response to receiving a mechanical input form the transmission 102. By way of example, the electromagnetic device 112 may be structured to utilize a negative torque supply to perform energy regeneration (e.g., when the torque demand therefrom is zero, during engine braking, while the vehicle 10 is coasting down a hill, etc.).

As shown in FIG. 2, the energy storage device 109 is electrically coupled to the electromagnetic device 112. In some embodiments, the energy storage device 109 and/or the electromagnetic device 112 are electrically coupled to one or more of the vehicle subsystems 120 (e.g., a regenerative braking system, electrically-powered vehicle accessories, etc.). According to the example embodiment shown in FIG. 2, the energy storage device 109 is structured to store electrical energy (i) received from a charging station (e.g., a vehicle charging station, etc.), (ii) generated by the electromagnetic device 112, and/or (iii) generated by a regenerative braking system. The energy storage device 109 may be structured to provide the stored electrical energy to (i) the vehicle subsystems 120 to operate various electrical based components of the vehicle 10 (e.g., while the engine 101 is running, while the engine 101 is off, etc.), (ii) the electromagnetic device 112 to start the engine 101 (e.g., in response to a restart command after a stop-start feature turns off the engine 101, when an operator keys on the engine 101, etc.), and/or (iii) the electromagnetic device 112 to facilitate providing a mechanical output to the transmission 102 (e.g., to drive the vehicle 10, etc.).

As shown in FIG. 3, the powertrain 115 (e.g., a full electric powertrain, etc.) includes the transmission 102, the driveshaft 103, the differential 104, the final drive 105, the energy storage device 109, and the electromagnetic device 112. In some embodiments, the powertrain 115 does not include the transmission 102. In alternative embodiments, the vehicle 10 does not include the electromagnetic device 112 and the energy storage device 109. By way of example, the vehicle 10 may include the engine 101 that is directly coupled to the transmission 102 such that the vehicle 10 has a conventional, internal combustion engine driven powertrain.

Referring again to FIGS. 1-3, the vehicle 10 includes the vehicle subsystems 120. In some embodiments, the vehicle subsystems 120 may include a regenerative braking system. The regenerative braking system may include various components structured to generate electricity from vehicle braking events to be stored by the energy storage device 109 for future use (e.g., by the first electromagnetic device 106, by the second electromagnetic device 108, by the electromagnetic device 112, by the electrical vehicle components, etc.). The vehicle subsystems 120 may include other components including mechanically driven or electrically driven vehicle components (e.g., HVAC system, lights, pumps, fans, etc.). The vehicle subsystems 120 may also include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The vehicle subsystems 120 may include one or more electrically-powered accessories and/or engine-drive accessories. Electrically-powered accessories may receive power from the energy storage device 109, the first electromagnetic device 106, the second electromagnetic device 108, and/or the electromagnetic device 112 to facilitate operation thereof. Being electrically-powered, the accessories may be able to be driven largely independent of the engine 101 of the vehicle 10 (e.g., not driven off of a belt coupled to the engine 101). The electrically-powered accessories may include, but are not limited to, air compressors (e.g., for pneumatic devices, etc.), air conditioning systems, power steering pumps, engine coolant pumps, fans, and/or any other electrically-powered vehicle accessories.

In a traditional, non-hybrid or non-electric powertrain, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired drive shaft speed. The rotating driveshaft 103 is received by the differential 104, which provides the rotation energy of the driveshaft 103 to the final drive 105. The final drive 105 then propels or moves the vehicle 10.

In the powertrain 100 of the present disclosure, the engine 101 provides mechanical energy to the first electromagnetic device 106 such that the first electromagnetic device 106 generates electrical power. The first electromagnetic device 106 may provide the generated electrical power to at least one of the second electromagnetic device 108 and the energy storage device 109. The second electromagnetic device 108 receives electrical power from at least one of the first electromagnetic device 106 and the energy storage device 109 to generate and provide a mechanical output to the transmission 102. In the powertrain 110 of the present disclosure, the engine 101 provides mechanical energy to the electromagnetic device 112 such that the electromagnetic device 112 generates electrical power. The electromagnetic device 112 may provide the generated electrical power to at least one of the energy storage device 109 and the electrically-powered accessories 122. The electromagnetic device 112 may additionally or alternatively provide a mechanical output to the transmission 102. In the powertrain 115 of the present disclosure, the electromagnetic device 112 receives electrical power from the energy storage device 109 to generate and provide a mechanical output to the transmission 102.

The operator I/O device 130 may enable an operator of the vehicle 10 (or passenger or manufacturing, service, or maintenance personnel) to communicate with the vehicle 10 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake pedal or a brake lever, an accelerator pedal, and/or an accelerator throttle.

The sensors 140 may include sensors positioned and/or structured to monitor operating characteristics of various components of the vehicle 10. By way of example, the sensors 140 may include a sensor structured to facilitate monitoring the state of charge ("SOC"), the state of health ("SOH"), and/or the power capacity of the energy storage device 109, and/or the flow of electricity into and/or out of the energy storage device 109 (e.g., current, voltage, power, etc.). The sensors 140 may additionally or alternatively include a position sensor structured to facilitate monitoring the position of the accelerator (e.g., accelerator pedal, accelerator throttle, etc.) and/or the brake (e.g., brake pedal, brake lever, etc.) of the vehicle 10. The sensors 140 may additionally or alternatively include a speed sensor structured to facilitate monitoring the speed of the vehicle 10. The sensors 140 may additionally or alternatively include an obstacle sensor structured to facilitate detecting whether the vehicle 10 (e.g., a wheel thereof, etc.) encounters an obstacle (e.g., a curb, a rock, a boulder, a speed bump, a pothole, etc.).

As the components of FIGS. 1-3 are shown to be embodied in the vehicle 10, the controller 150 may be structured as one or more electronic control units (ECU). As such, the controller 150 may be separate from or included with at least one of a transmission control unit, an exhaust aftertreatment control unit, a powertrain control module, an engine control module, etc. The function and structure of the controller 150 is described in greater detail in FIG. 4.

Figure 4:
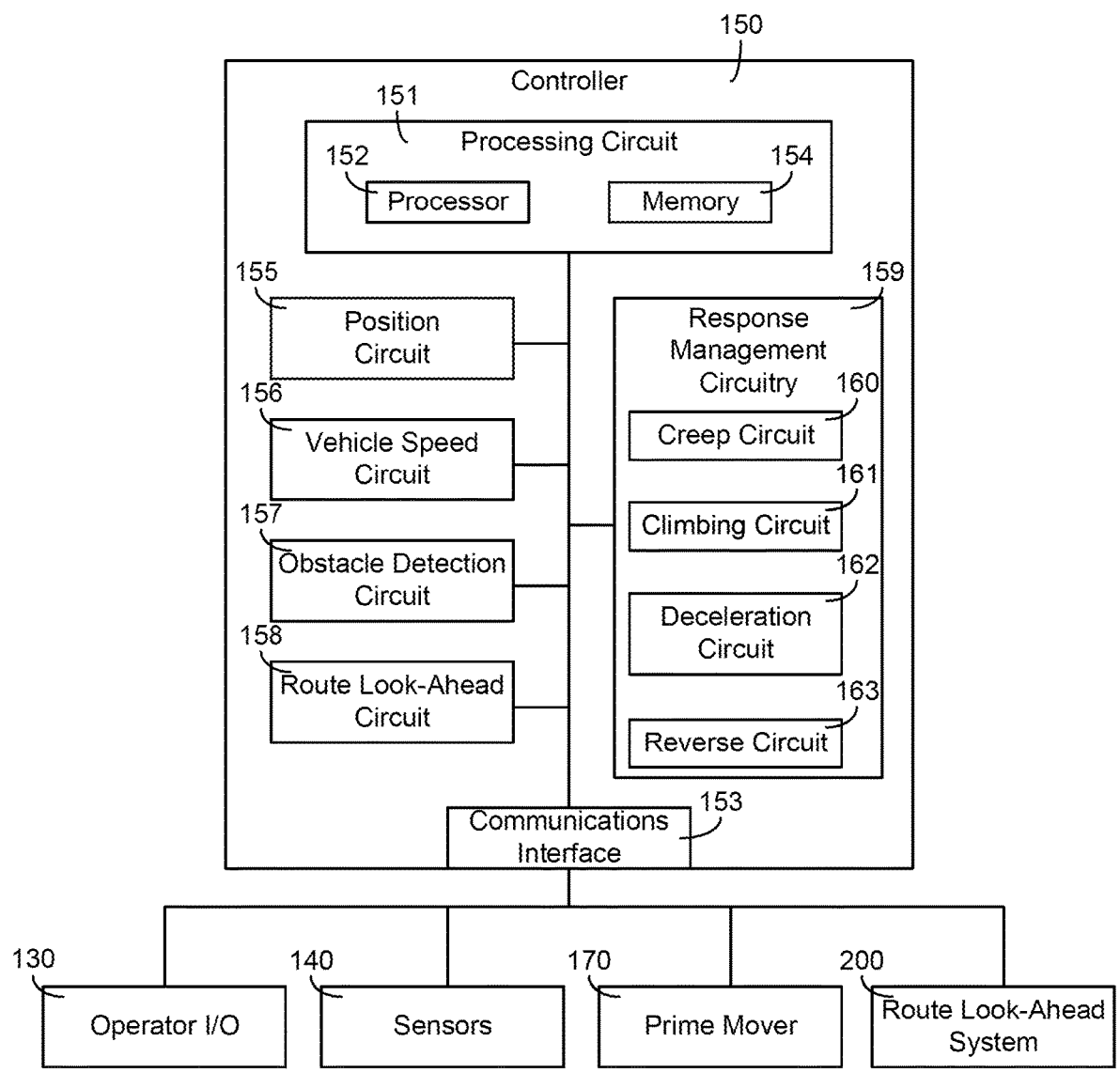
FIG. 4 is a schematic of a controller used with the system of FIGS. 1-3, according to an example embodiment.

Referring now to FIG. 4, a schematic diagram of the controller 150 of the vehicle 10 of FIGS. 1-3 is shown according to an example embodiment. As shown in FIG. 4, the controller 150 includes a processing circuit 151 having a processor 152 and a memory 154; a position circuit 155; a vehicle speed circuit 156; an obstacle detection circuit 157; a route look-ahead circuit 158; response management circuitry 159 having a creep circuit 160, a climbing circuit 161, a deceleration circuit 162, and a reverse circuit 163; and a communications interface 153. As described herein, the controller 150 is structured to dynamically remap an associated response of a prime mover 170 of the vehicle 10 based on a position (e.g., a degree of engagement, etc.) of the accelerator and/or the brake of the vehicle 10 in response to receiving an indication of a remapping condition. According to the example embodiment shown in FIG. 1, the prime mover 170 is the second electromagnetic device 108. According to the example embodiments shown in FIGS. 2 and 3, the prime mover 170 is the electromagnetic device 112. In other embodiments, the prime mover 170 is the engine 101 (e.g., in an embodiment where the powertrain of the vehicle 10 a non-hybrid, non-electric powertrain, etc.). The prime mover 170 may therefore be any of the engine 101, the second electromagnetic device 108, and/or the electromagnetic device 112.

In one configuration, the position circuit 155, the vehicle speed circuit 156, the obstacle detection circuit 157, the route look-ahead circuit 158, and the response management circuitry 159 are embodied as machine or computer-readable media that is executable by a processor, such as the processor 152. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the position circuit 155, the vehicle speed circuit 156, the obstacle detection circuit 157, the route look-ahead circuit 158, and the response management circuitry 159 are embodied as hardware units, such as electronic control units. As such, the position circuit 155, the vehicle speed circuit 156, the obstacle detection circuit 157, the route look-ahead circuit 158, and/or the response management circuitry 159 may be embodied as one or more circuitry components including, but not limited to, processing circuitry, network interfaces, peripheral devices, input devices, output devices, sensors, etc. In some embodiments, the position circuit 155, the vehicle speed circuit 156, the obstacle detection circuit 157, the route look-ahead circuit 158, and/or the response management circuitry 159 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the position circuit 155, the vehicle speed circuit 156, the obstacle detection circuit 157, the route look-ahead circuit 158, and/or the response management circuitry 159 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the position circuit 155, the vehicle speed circuit 156, the obstacle detection circuit 157, the route look-ahead circuit 158, and/or the response management circuitry 159 may also include programmable hardware devices such as field programmable gate arrays, programmable array logic, programmable logic devices or the like. In this regard, the position circuit 155, the vehicle speed circuit 156, the obstacle detection circuit 157, the route look-ahead circuit 158, and/or the response management circuitry 159 may include one or more memory devices for storing instructions that are executable by the processor(s) of the position circuit 155, the vehicle speed circuit 156, the obstacle detection circuit 157, the route look-ahead circuit 158, and/or the response management circuitry 159. The one or more memory devices and processor(s) may have the same definition as provided below with respect to the memory 154 and the processor 152. Thus, in this hardware unit configuration, the position circuit 155, the vehicle speed circuit 156, the obstacle detection circuit 157, the route look-ahead circuit 158, and/or the response management circuitry 159 may be geographically dispersed throughout separate locations in the vehicle 10 (e.g., separate control units, etc.). Alternatively and as shown, the position circuit 155, the vehicle speed circuit 156, the obstacle detection circuit 157, the route look-ahead circuit 158, and/or the response management circuitry 159 may be embodied in or within a single unit/housing, which is shown as the controller 150.

In the example shown, the controller 150 includes the processing circuit 151 having the processor 152 and the memory 154. The processing circuit 151 may be structured or configured to execute or implement the instructions, commands, and/or control processes described herein with respect to the position circuit 155, the vehicle speed circuit 156, the obstacle detection circuit 157, the route look-ahead circuit 158, and/or the response management circuitry 159. Thus, the depicted configuration represents the aforementioned arrangement where the position circuit 155, the vehicle speed circuit 156, the obstacle detection circuit 157, the route look-ahead circuit 158, and/or the response management circuitry 159 are embodied as machine or computer-readable media. However, as mentioned above, this illustration is not meant to be limiting as the present disclosure contemplates other embodiments such as the aforementioned embodiment where the position circuit 155, the vehicle speed circuit 156, the obstacle detection circuit 157, the route look-ahead circuit 158, and the response management circuitry 159, or at least one circuit of the position circuit 155, the vehicle speed circuit 156, the obstacle detection circuit 157, the route look-ahead circuit 158, and the response management circuitry 159, are configured as a hardware unit. All such combinations and variations are intended to fall within the scope of the present disclosure.

The processor 152 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the position circuit 155, the vehicle speed circuit 156, the obstacle detection circuit 157, the route look-ahead circuit 158, and/or the response management circuitry 159 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 154 (e.g., RAM, ROM, Flash Memory, hard disk storage, etc.) may store data and/or computer code for facilitating the various processes described herein. The memory 154 may be communicably connected to the processor 152 to provide computer code or instructions to the processor 152 for executing at least some of the processes described herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The communications interface 153 may include wired or wireless interfaces (e.g., jacks, antennas, transmitters, receivers, transceivers, wire terminals, etc.) for conducting data communications with various systems, devices, or networks. For example, the communications interface 153 may include an Ethernet card and port for sending and receiving data via an Ethernet-based communications network and/or a Wi-Fi transceiver for communicating via a wireless communications network. The communications interface 153 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 153 of the controller 150 may facilitate communication between and among the controller 150 and one or more components of the vehicle 10 (e.g., components of the powertrain 100, components of the powertrain 110, components of the powertrain 115, the vehicle subsystems 120, the operator I/O device 130, the sensors 140, the prime mover 170, a route look-ahead system 200, etc.). Communication between and among the controller 150 and the components of the vehicle 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The position circuit 155 is structured to receive position data (e.g., from a position sensor of the sensors 140, etc.) indicative of a position of an accelerator (e.g., accelerator pedal, throttle, etc.) and/or a brake (e.g., brake pedal, lever, etc.) of the vehicle 10. The position circuit 155 may thereby facilitate monitoring the position of the accelerator and/or the brake of the vehicle 10. According to an example embodiment, the position of the accelerator (e.g., the degree of engagement thereof, etc.) corresponds with an associated response of the prime mover 170 of the vehicle 10 (e.g., the engine 101, the second electromagnetic device 108, the electromagnetic device 112, etc.). The associated response of the prime mover 170 may include at least one of a torque output and a power output of the prime mover 170. According to an example embodiment, the position of the brake (e.g., the degree of engagement thereof, etc.) corresponds with an associated response of a braking system of the vehicle 10. For example, a depression of ten percent of the maximum allowable depression amount of the brake may correspond with the generation of a ten percent braking force. As another example, a depression of twenty percent of the maximum allowable depression amount may correspond with the generation of a thirty percent braking force. Thus, the braking force does not need to linearly correspond with the braking depression amount. Of course, in certain embodiments, a linear relationship may exist between the braking force and braking depression amount.

The vehicle speed circuit 156 is structured to monitor a speed of the vehicle 10. By way of example, the vehicle speed circuit 156 may include and/or be communicably coupled to a speed sensor of the sensors 140 that is structured to acquire speed data. The vehicle speed circuit 156 may thereby receive and interpret the speed data to determine the speed of the vehicle 10. In other embodiments, the vehicle speed circuit 156 otherwise receives and/or determines the speed of the vehicle 10.

The obstacle detection circuit 157 is structured to detect an obstacle condition regarding the vehicle 10 encountering an obstacle. By way of example, the obstacle detection circuit 157 may be structured to detect the obstacle condition indicting a wheel of the vehicle 10 encountered an obstacle. The "obstacle" refers to any impediment, course-altering, and/or change-of-driving (slow down, stop, speed-up) object. For example, the object may include, but it not limited to, a curb, a rock, a pothole, a speed bump, etc. For example, the obstacle detection circuit 157 may determine the obstacle condition in response to one of the wheels of the vehicle 10 starting to elevate higher relative to the rest of the wheels of the vehicle 10 (e.g., such that the suspension of the respective wheel assembly starts to compress or extend, the vehicle 10 starts to becomes unlevel, etc.). By way of another example, the obstacle detection circuit 157 may be structured to detect the obstacle condition indicating that a wheel of the vehicle 10 encountered an obstacle (e.g., a curb, a rock, a pothole, a speed bump, etc.) in response to the vehicle slowing down or being stopped by the obstacle (e.g., the wheel requires additional power to traverse the obstacle, etc.). For example, the vehicle 10 may encounter a curb when making a turn such that the wheel temporarily climbs the curb onto a sidewalk, an edge of a road, etc. Such detection of an obstacle may be facilitated by the use of various sensors (e.g., suspension displacement/position sensors, gyroscopes, accelerometers, force sensors, strain sensors, speed sensors, GPS, etc.) and/or data analytics (e.g., look-up tables, models, algorithms, etc.).

The route look-ahead circuit 158 is structured to receive route look-ahead data indicative of at least one of road parameters and traffic conditions ahead of the vehicle 10. By way of example, the route look-ahead circuit 158 may be communicably coupled to the route look-ahead system 200 (e.g., via the communications interface 153, etc.) and structured to receive the route look-ahead data therefrom. The road parameters may include information regarding road function class (e.g., freeway/interstate, arterial roads, collectors, local roads, unclassified roads, etc.), speed limits, road grade, road slope, road curvature, bridges, fuel stations, number of lanes, weather conditions, road surface conditions, and the like.

The response management circuitry 159 is structured to receive an indication regarding the position of the accelerator (e.g., from the position circuit 155, etc.), the position of the brake (e.g., from the position circuit 155, etc.), and/or the speed of the vehicle 10 (e.g., from the vehicle speed circuit 156, etc.). The response management circuitry 159 may be further structured to determine that the indication regarding the accelerator position, the brake position, and/or the speed of the vehicle 10 satisfies a remapping condition. The "remapping condition" includes at least one of a creep condition, an obstacle condition, a braking/deceleration condition, and a reverse condition. The response management circuit 159 may be further structured to dynamically remap the associated response of the prime mover 170 of the vehicle 10 (e.g., where the response of the prime mover 170 is based on the position of the accelerator, etc.) and/or the braking system of the vehicle 10 in response to the indication satisfying the remapping condition. The various remapping conditions (e.g., the creep condition, the obstacle condition, the deceleration/braking condition, the reverse condition, etc.) are described more fully herein with regards to the creep circuit 160, the climbing circuit 161, the deceleration circuit 162, and the reverse circuit 163.

The creep circuit 160 is structured to detect the creep condition. By way of example, the creep circuit 160 may be structured to determine the creep condition is present in response to the speed of the vehicle 10 being less than a creep threshold speed level (e.g., for a threshold period of time, while experiencing braking events, while experiencing stopping events, etc.). The response management circuit 159 may be structured to remap the associated response of the prime mover 170 of the vehicle 10 from a normal driving mode of operation to a creep mode of operation such that the associated response of the prime mover 170 provides an output at a zero percent accelerator position and above a zero percent accelerator position during the creep condition.

Conventional powertrain systems (e.g., powertrains having an engine, a torque converter, an automatic transmission, etc.) may provide an immediate torque transmission to the wheels of a vehicle when the brake pedal is released. Such a torque transmission remains the same (e.g., assuming all else including vehicle weight, road grad, etc. is unchanged) every time the vehicle is at rest/stop and the brake pedal is released. In powertrains that include a motor-generator (e.g., the powertrain 100, the powertrain 110, the powertrain 115, etc.), such a torque transmission may be quite useful during slow maneuvers (e.g., vehicle creep, etc.) of a vehicle (e.g., at loading docks, high traffic conditions, etc.). However, this same characteristic may not be of value during normal vehicle operation for vehicles that have a motor-generator as a prime mover (e.g., the second electromagnetic device 108, the electromagnetic device 112, etc.) since each time the accelerator would drop to a zero percent position (e.g., while the vehicle is propelling, etc.), the prime mover would disadvantageously drop to a low torque state and a low efficiency operating condition.

The response management circuit 159 may therefore be structured to selectively remap the associated response of the prime mover 170 between the normal driving mode of operation and the creep mode of operation based on the speed of the vehicle 10 relative to the creep threshold speed level (e.g., three, five, seven, ten, fifteen, etc. miles per hour). For example, during regular or normal "higher" speed operation (e.g., at vehicle speeds above the creep threshold speed level, etc.), the response management circuit 159 may set the associated response of the prime mover 170 to the normal driving mode of operation. During the normal driving mode of operation, the prime mover 170 may provide (i) positive torque (e.g., for propulsion, etc.) at or above a predefined upper accelerator position (e.g., greater than or equal to 5%, 10%, etc. depressed), (ii) negative torque (e.g., for energy generation, etc.) at or below a predefined lower accelerator position (e.g., less than or equal to 0%, 1%, 2%, 3%, 5%, etc. depressed), and (iii) zero torque (e.g., for coasting, etc.) when the accelerator is between the predefined lower accelerator position and the predefined upper accelerator position.

The response management circuit 159 may further be structured to remap the associated response of the prime mover 170 based on the accelerator position from the normal driving mode of operation to the creep mode of operation in response to the vehicle speed decreasing below the creep threshold speed level. During the creep mode of operation, the prime mover 170 may provide positive torque at and above a 0% accelerator position (e.g., while the vehicle speed remains less than the creep threshold speed level, etc.). Remapping the associated response of the prime mover 170 to the creep mode of operation from the normal driving mode while at low speeds (e.g., at vehicle speeds that are less than the creep threshold speed level, etc.) may provide a creep operation without the need for an operator to switch back and forth between the accelerator and brake pedals, while providing for energy regeneration events with the accelerator during higher speed driving (e.g., at vehicle speeds that are greater than the creep threshold speed level, etc.).

The climbing circuit 161 is structured to perform various operations in response to the obstacle detection circuit 157 detecting the obstacle condition. By way of example, the climbing circuit 161 may be structured to determine the obstacle condition is present based on (i) determining the wheel of the vehicle 10 encountered an obstacle (e.g., via the obstacle detection circuit 157, etc.), (ii) determining the speed of the vehicle 10 is less than a climbing threshold speed level (e.g., based on the speed data acquired by the vehicle speed circuit 156, etc.), and/or (iii) determining the vehicle 10 is turning (e.g., based on a steering angle, a dash interface, a compass heading, etc.). The response management circuit 159 may be structured to remap the associated response of the prime mover 170 from a normal driving mode of operation to a climbing mode of operation such that the associated response of the prime mover 170 increases for a respective accelerator position in response to (i) the wheel of the vehicle 10 encountering the obstacle, (ii) the speed of the vehicle 10 being less than the climbing threshold speed level, and/or (iii) the vehicle 10 making a turn.

As an example, during slow velocity maneuvers, vehicles may experience a wheel/tire that comes into contact with a curb (e.g., a transit bus making a tight turn in a city, etc.), causing the speed of the vehicle to decrease or stop the vehicle completely. Conventionally, such an event requires an operator to provide substantial change to the accelerator position that in turn results in increased engine torque to facilitate the obstacle climb maneuver. Advantageously, the response management circuit 159 may be structured to remap the associated response of the prime mover 170 from the normal driving mode of operation to the climbing mode of operation in response to the climbing circuit 161 detecting the obstacle condition. Therefore, the operator does not need to provide a substantial change to the accelerator positon to traverse the obstacle. For example, during the climbing mode of operation, the prime mover 170 may provide an increased torque output based on the accelerator position relative to the same accelerator position during the normal driving mode of operation. By way of example, a 10% accelerator position may correspond with a 10% of the max torque of the prime mover 170 during the normal driving mode of operation, while the 10% accelerator position may correspond with an increased percentage of the max torque of the prime mover 170 (e.g., 15%, 25%, 30%, 50%, etc.). Therefore, the response management circuit 159 may ramp up the associated response of the prime mover 170 based on the accelerator position without waiting for an operator response or input. The response management circuit 159 may be further structured to revert (e.g., de-scale, remap, etc.) the associated response back to the normal driving mode of operation after the obstacle has been traversed and the obstacle condition has been overcome.

The deceleration circuit 162 is structured to detect the deceleration condition regarding a deceleration or braking event for the vehicle 10 (e.g., based on the position of the brake, etc.). The deceleration circuit 162 may be further structured to determine whether the vehicle speed is greater than a deceleration threshold speed level (e.g., based on the speed data acquired by the vehicle speed circuit 156, etc.). The response management circuit 159 may be structured to remap the associated response of the prime mover 170 such that the associated response of the prime mover 170 activates at a lower accelerator position than prior to the deceleration or braking event upon a subsequent acceleration and/or while the speed of the vehicle 10 is greater than the deceleration threshold speed level. In some embodiments, the response management circuit 159 is further structured to dynamically adjust the lower accelerator position based on the route look-ahead data (e.g., acquired by the route look-ahead circuit 158, etc.).

The response management circuit 159 may therefore be structured to selectively remap the associated response of the prime mover 170 between a normal driving mode of operation and a deceleration mode of operation based on the deceleration or braking event being detected (e.g., the vehicle 10 slowing down, a brake pedal being depressed, the speed of the vehicle being above the deceleration threshold speed level, etc.). For example, during regular or normal "higher" speed operation, the response management circuit 159 may set the associated response of the prime mover 170 to the normal driving mode of operation. During the normal driving mode of operation, the prime mover 170 may provide (i) positive torque (e.g., for propulsion, etc.) at or above a predefined upper accelerator position (e.g., greater than or equal to 5%, 10%, etc. depressed), (ii) negative torque (e.g., for energy generation, etc.) at or below a predefined lower accelerator position (e.g., less than or equal to 0%, 1%, 2%, 3%, 5%, etc. depressed), and (iii) zero torque (e.g., for coasting, etc.) when the accelerator is between the predefined lower accelerator position and the predefined upper accelerator position.

The response management circuit 159 may further be structured to remap the associated response of the prime mover 170 based on the accelerator position from the normal driving mode of operation to the deceleration mode of operation in response to the vehicle speed decreasing (e.g., the vehicle 10 slowing down, a brake pedal being depressed, etc.), while the speed of the vehicle 10 remains above the deceleration threshold speed level. During the deceleration mode of operation, the prime mover 170 may provide positive torque at and above a lower or lesser accelerator position than prior to the deceleration or braking event upon a subsequent acceleration (e.g., when the brake pedal is released and the accelerator is reengaged, etc.).

Figure 5:
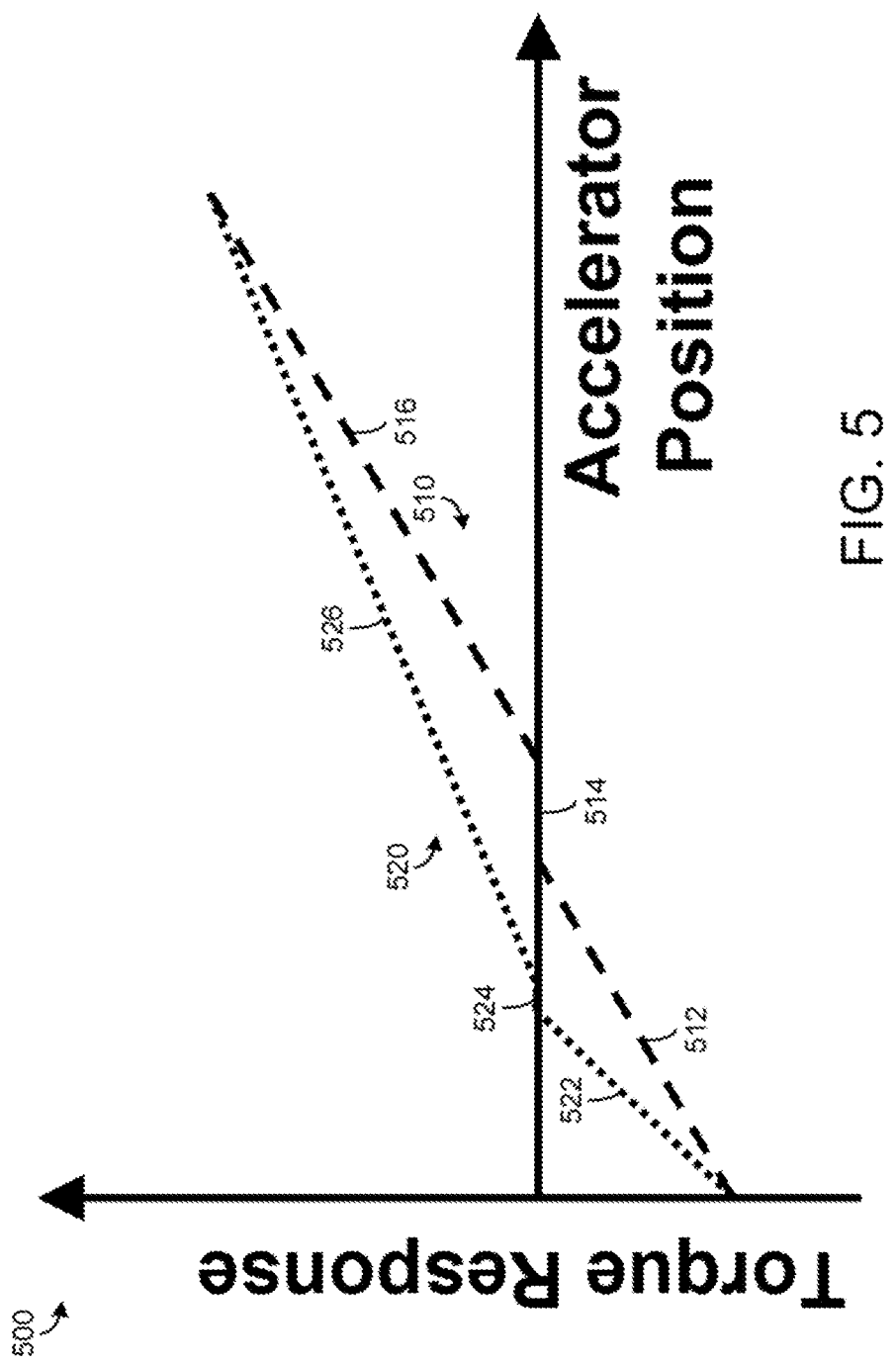
FIG. 5 is a graph of a first response curve and a second response curve for a prime mover, according to an example embodiment.

Referring to FIG. 5, an example graph 500 of a normal response curve 510 representative of the normal driving mode of operation and a deceleration response curve 520 representative of the deceleration mode of operation is shown, according to an example embodiment. As shown in FIG. 5, (i) the normal response curve 510 has a negative torque portion or braking zone 512, a zero torque portion or dead band zone 514, and a positive torque portion or propulsion zone 516, and (ii) the deceleration response curve 520 has a negative torque portion or braking zone 522, a zero torque portion or dead band zone 524, and a positive torque portion or propulsion zone 526. Through a comparison of the normal response curve 510 and the deceleration response curve 520, (i) the braking zone 522 has a steeper or greater slope than the braking zone 512 and (ii) the dead band zone 524 is relatively smaller than the dead band zone 514. Therefore, remapping the associated response of the prime mover 170 to the deceleration mode of operation from the normal driving mode while at higher speeds (e.g., at vehicle speeds that are greater than the deceleration threshold speed level, etc.) may provide for a quicker power and/or torque application (e.g., acceleration, propulsion, etc.). The vehicle 10 may thereby transition from a braking zone, through a dead band zone, and into a propulsion zone substantially quicker upon receiving a subsequent acceleration request (e.g., from an operator releasing the brake pedal and pressing the accelerator pedal, etc.) after a deceleration or braking event. In some embodiments, the response management circuit 159 is structured to dynamically adjust the deceleration response curve 520 based on the traffic conditions and/or the road parameters indicated by the route look-ahead data. The response curves may be designed in a number of ways to maintain smoot transitions while achieving a high degree of energy recapture.

The reverse circuit 163 is structured to detect the reverse condition regarding the vehicle 10 driving in reverse (e.g., in response to a shift lever being manipulated into a reverse position, etc.). The reverse circuit 163 may be further structured to determine whether the vehicle speed is less than a reverse threshold speed level (e.g., based on the speed data acquired by the vehicle speed circuit 156, etc.). The response management circuit 159 may be structured to remap the associated response of the prime mover 170 from a normal driving mode of operation to a reverse mode of operation such that the associated response of the prime mover 170 reduces for a respective accelerator position during the reverse condition and/or while the speed of the vehicle 10 is less than the reverse threshold speed level.

As an example, during slow velocity reverse maneuvers, conventional vehicle systems typically have the same accelerator position response curve as during forward motion. Advantageously, the response management circuit 159 may be structured to remap the associated response of the prime mover 170 from the normal driving mode of operation to the reverse mode of operation in response to the reverse circuit 163 detecting the reverse condition such that the associated response of the prime mover 170 reduces for a respective accelerator position. Such reduction in the associated response provides the operator with increased resolution and control while driving in reverse. For example, full pedal travel while in the reverse mode of operation may not correspond with 100% of the toque and/or power of the prime mover 170. By way of example, a 100% accelerator position may correspond with a lesser torque output (e.g., 50%, 75%, 25%, etc.) of the prime mover 170 during the reverse driving mode of operation. Reverse maneuvers may therefore be more easily performed due to providing an operator with less pedal sensitivity, and therefore increased control over the speed of the vehicle 10.

In some embodiments, the response management circuit 159 is structured to additionally or alternatively remap the associated response of the braking system of the vehicle 10 (e.g., friction brakes, motor-generator braking, etc.) based on the position of the brake (e.g., degree of engagement thereof, etc.). Such remapping may be useful to increase energy regeneration during stopping and/or deceleration events. By way of example, the response management circuit 159 may be structured to remap the response of the prime mover 170 such that the prime mover 170 provides a greater portion of vehicle braking than the friction brakes of the vehicle 10 for a greater portion of the brake travel (e.g., to increase energy regeneration, etc.) during certain stopping/deceleration events. Such stopping/deceleration events may include events where immediate stopping is not required, the vehicle 10 is traveling below a preset speed threshold (e.g., twenty, thirty, forty, etc. miles-per-hour), etc. For example, the response management circuit 159 may remap the associated response of the braking system such that the prime mover 170 is favored over the friction brakes for greater brake travel when the vehicle 10 is not near another vehicle or obstacle (e.g., no imminent collision is detected, etc.). As another example, the response management circuit 159 may remap the associated response of braking system such that the prime mover 170 is favored over the friction brakes for greater brake travel when the vehicle 10 is traveling at lower speeds such that the friction brakes are not needed to sufficiently slow the vehicle 10. In some embodiments, the response management circuit 159 is structured to additionally or alternatively remap the associated response of the prime mover 170 of the vehicle 10 based on the position of the brake upon subsequent acceleration of the vehicle 10 in response to engagement of the accelerator (e.g., such as described herein regarding the deceleration condition, etc.).

Figure 6:
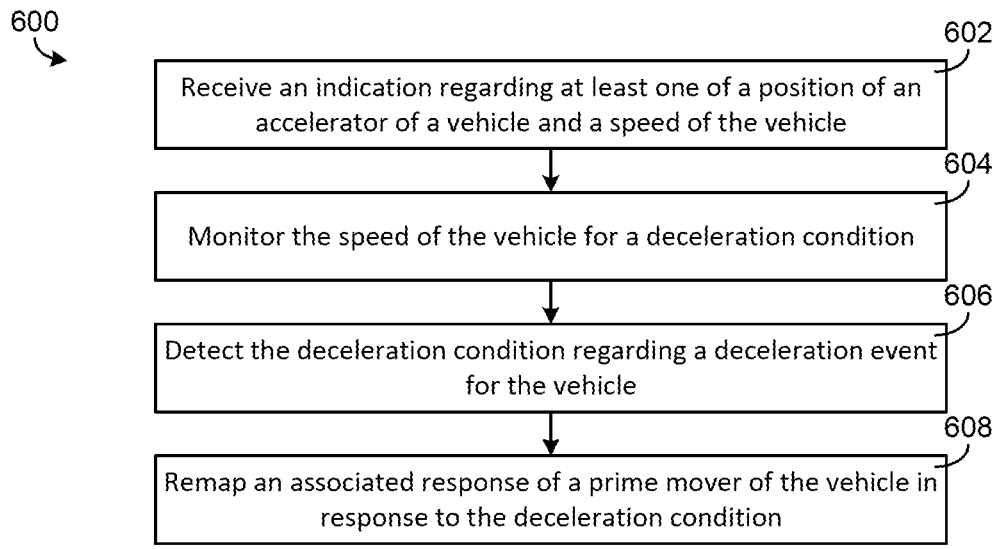
FIG. 6 is a flow diagram of a method for dynamically managing accelerator response of a prime mover of a vehicle, according to an example embodiment.

Referring now to FIG. 6, a method 600 for dynamically managing accelerator response of a prime mover of a vehicle is shown according to an example embodiment. In one example embodiment, method 600 may be implemented with the vehicle 10 and the controller 150 of FIGS. 1-4. As such, method 600 may be described with regard to FIGS. 1-4.

At process 602, the controller 150 is structured to receive an indication regarding at least one of an accelerator position of an accelerator of a vehicle (e.g., the vehicle 10, etc.) and a speed of the vehicle. The accelerator position may correspond with an associated response of a prime mover (e.g., the prime mover 170, the engine 101, the second electromagnetic device 108, the electromagnetic device 112, etc.) of the vehicle. The associated response may include at least one of a torque output and a power output of the prime mover. At process 604, the controller 150 is structured to monitor the speed of the vehicle for a deceleration condition. By way of example, the deceleration condition may be detected based on a deceleration event indicated by the speed of the vehicle reducing, a brake pedal being pressed, etc. and/or while the speed of the vehicle remains above a threshold speed level (e.g., the vehicle is not moving too slowly, etc.). At process 606, the controller 150 is structured to detect the deceleration condition regarding the deceleration event for the vehicle. At process 608, the controller 150 is structured to remap the associated response of the prime mover such that the associated response of the prime mover activates at a lower accelerator position than prior to the deceleration event upon a subsequent acceleration in response to the deceleration condition.

Figure 7:
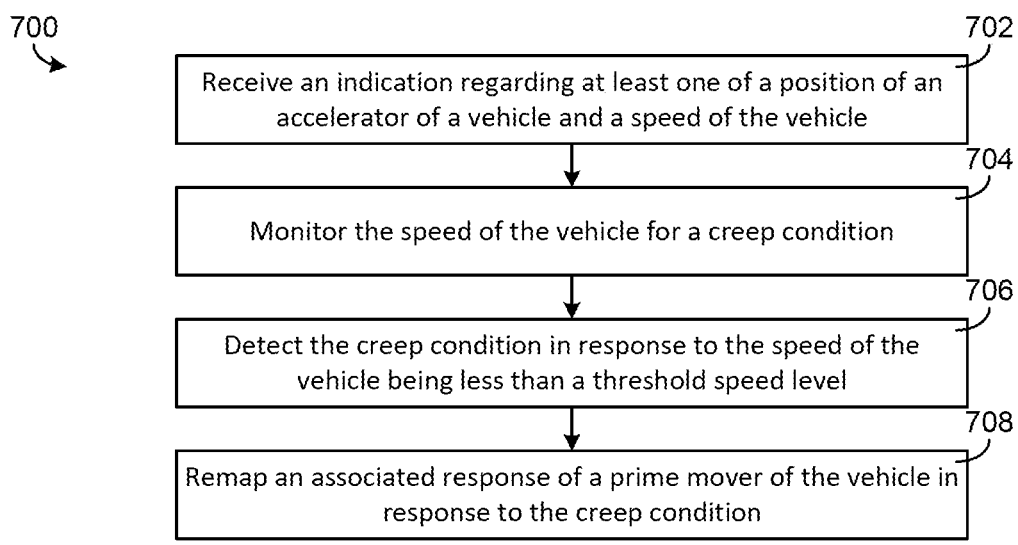
FIG. 7 is a flow diagram of a method for dynamically managing accelerator response of a prime mover of a vehicle, according to another example embodiment.

Referring now to FIG. 7, a method 700 for dynamically managing accelerator response of a prime mover of a vehicle is shown according to an example embodiment. In one example embodiment, method 700 may be implemented with the vehicle 10 and the controller 150 of FIGS. 1-4. As such, method 700 may be described with regard to FIGS. 1-4.

At process 702, the controller 150 is structured to receive an indication regarding at least one of an accelerator position of an accelerator of a vehicle (e.g., the vehicle 10, etc.) and a speed of the vehicle. The accelerator position may correspond with an associated response of a prime mover (e.g., the prime mover 170, the engine 101, the second electromagnetic device 108, the electromagnetic device 112, etc.) of the vehicle. The associated response may include at least one of a torque output and a power output of the prime mover. At process 704, the controller 150 is structured to monitor the speed of the vehicle for a creep condition. By way of example, the creep condition may be detected based on the speed of the vehicle reducing and/or remaining below a threshold speed level (e.g., the vehicle is moving relatively slowly, etc.). At process 706, the controller 150 is structured to detect the creep condition in response to the speed of the vehicle being less than the threshold speed level. At process 708, the controller 150 is structured to remap the associated response of the prime mover such that the associated response of the prime mover provides an output at and above a zero percent accelerator position during the creep condition.

Figures 8, 9:
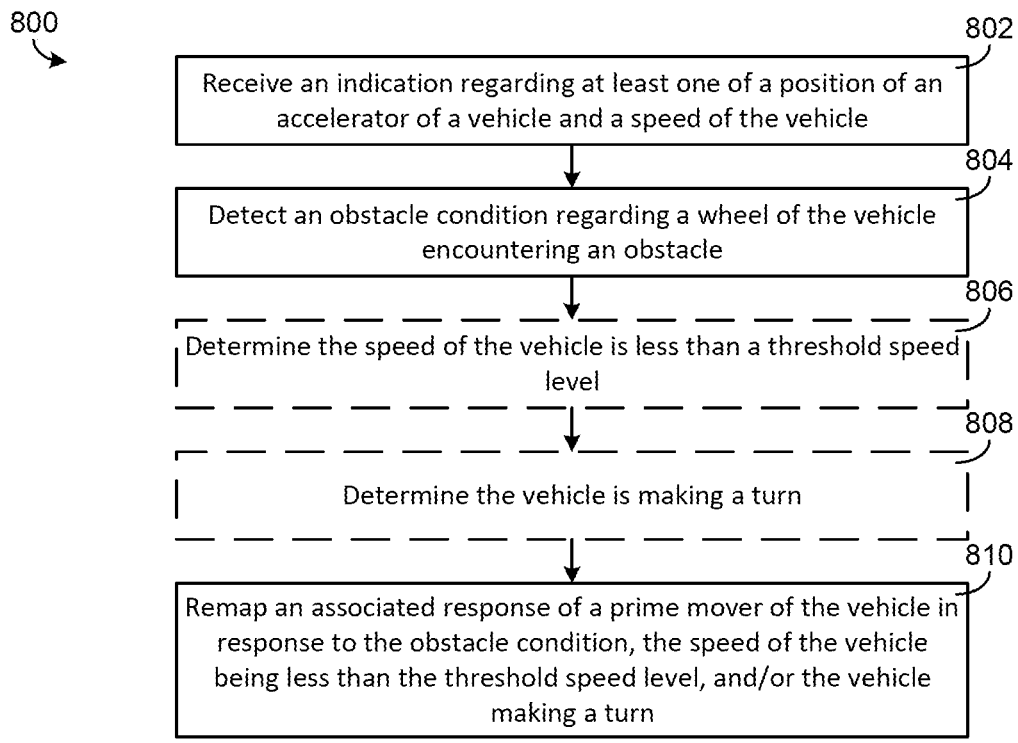
FIG. 8 is a flow diagram of a method for dynamically managing accelerator response of a prime mover of a vehicle, according to still another example embodiment.
FIG. 9 is a flow diagram of a method for dynamically managing accelerator response of a prime mover of a vehicle, according to yet another example embodiment.

Referring now to FIG. 8, a method 800 for dynamically managing accelerator response of a prime mover of a vehicle is shown according to an example embodiment. In one example embodiment, method 800 may be implemented with the vehicle 10 and the controller 150 of FIGS. 1-4. As such, method 800 may be described with regard to FIGS. 1-4.

At process 802, the controller 150 is structured to receive an indication regarding at least one of an accelerator position of an accelerator of a vehicle (e.g., the vehicle 10, etc.) and a speed of the vehicle. The accelerator position may correspond with an associated response of a prime mover (e.g., the prime mover 170, the engine 101, the second electromagnetic device 108, the electromagnetic device 112, etc.) of the vehicle. The associated response may include at least one of a torque output and a power output of the prime mover. At process 804, the controller 150 is structured to detect an obstacle condition regarding a wheel of the vehicle encountering an obstacle (e.g., a curb, a rock, a speed bump, etc.). At process 806, the controller 150 may optionally be structured to determine whether the speed of the vehicle is less than a threshold speed level. At process 808, the controller 150 may optionally be structured to determine whether the vehicle is making a turn. At process 810, the controller 150 is structured to remap the associated response of the prime mover such that the associated response of the prime mover increases for a respective accelerator position during the obstacle condition in response to the obstacle condition, the speed of the vehicle being less than the threshold speed level, and/or the vehicle making a turn.

Referring now to FIG. 9, a method 900 for dynamically managing accelerator response of a prime mover of a vehicle is shown according to an example embodiment. In one example embodiment, method 900 may be implemented with the vehicle 10 and the controller 150 of FIGS. 1-4. As such, method 900 may be described with regard to FIGS. 1-4.

At process 902, the controller 150 is structured to receive an indication regarding at least one of an accelerator position of an accelerator of a vehicle (e.g., the vehicle 10, etc.) and a speed of the vehicle. The accelerator position may correspond with an associated response of a prime mover (e.g., the prime mover 170, the engine 101, the second electromagnetic device 108, the electromagnetic device 112, etc.) of the vehicle. The associated response may include at least one of a torque output and a power output of the prime mover. At process 904, the controller 150 is structured to detect a reverse condition regarding of the vehicle driving in reverse. At process 906, the controller 150 may optionally be structured to determine whether the speed of the vehicle is less than a threshold speed level. At process 908, the controller 150 is structured to remap the associated response of the prime mover such that the associated response of the prime mover reduces for a respective accelerator position during the reverse condition.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 4, it should be understood that the controller 150 may include any number of circuits for completing the functions described herein. For example, the activities and functionalities of the position circuit 155, the vehicle speed circuit 156, the obstacle detection circuit 157, the route look-ahead circuit 158, and/or the response management circuitry 159 may be combined in multiple circuits or as a single circuit. Additional circuits with additional functionality may also be included. Further, it should be understood that the controller 150 may further control other activity beyond the scope of the present disclosure.

As mentioned above and in one configuration, the "circuits" may be implemented in machine-readable medium for execution by various types of processors, such as processor 152 of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A non-transitory computer readable medium having computer-executable instructions stored therein, the instructions, when executed by one or more processors, cause the one or more processors to perform operations comprising:
controlling a prime mover to provide a negative torque response and a positive torque response with a zero torque operating condition between the negative torque response and the positive torque response;
receiving an indication regarding a deceleration event for a vehicle based on at least one of an accelerator being disengaged by an operator or a brake being engaged by the operator; and
remapping a response of a prime mover of the vehicle from following a first response curve to following a deceleration response curve in response to the deceleration event;
wherein (a) a first slope of the negative torque response for the deceleration response curve is greater than a second slope of the negative torque response for the first response curve and (b) a first range of the zero torque operating condition for the deceleration response curve is smaller than a second range of the zero torque operating condition for the first response curve, thereby reducing an overall range of the accelerator that is associated with the negative torque response and the zero torque operating condition.

2. The non-transitory computer readable medium of claim 1, wherein, in response to the accelerator being engaged by the operator following the deceleration event, an output of the prime mover to accelerate the vehicle activates at a relatively lesser amount of depression of the accelerator from a non-depressed state of the accelerator than prior to the deceleration event.

3. The non-transitory computer readable medium of claim 1, wherein the instructions, when executed by the one or more processors, further cause the one or more processors to perform operations comprising:
monitoring a speed of the vehicle; and
remapping the response of the prime mover in response to (i) the deceleration event and (ii) the speed of the vehicle being greater than a speed threshold.

4. The non-transitory computer readable medium of claim 3, wherein the speed threshold is three miles per hour or more.

5. The non-transitory computer readable medium of claim 4, wherein the speed threshold is five miles per hour or more.

6. The non-transitory computer readable medium of claim 5, wherein the speed threshold is ten miles per hour or more.

7. The non-transitory computer readable medium of claim 6, wherein the speed threshold is fifteen miles per hour or more.

8. The non-transitory computer readable medium of claim 1, wherein the instructions, when executed by the one or more processors, further cause the one or more processors to perform operations comprising:
monitoring a speed of the vehicle;
detecting a creep condition in response to the speed being less than a threshold speed level; and
remapping the response of the prime mover in response to the creep condition such that the prime mover provides an output at and above a zero percent position of the accelerator during the creep condition.

9. The non-transitory computer readable medium of claim 1, wherein the instructions, when executed by the one or more processors, cause the one or more processors to perform operations comprising:
detecting an obstacle condition regarding a respective wheel of the vehicle encountering an obstacle (i) in response to determining that the respective wheel is elevating or extending as a result of the respective wheel encountering the obstacle and (ii) while a speed of the vehicle is less than a predefined obstacle threshold speed level such that engagement of the respective wheel with the obstacle slows or stops the vehicle from moving; and
remapping the response of the prime mover in response to (i) detecting the obstacle condition and (ii) the speed of the vehicle being less than the predefined obstacle threshold speed level such that the response of the prime mover increases for a respective position of the accelerator and, therefore, the respective wheel is capable of traversing the obstacle without requiring the operator increase in a position of the accelerator.

10. The non-transitory computer readable medium of claim 1, wherein the instructions, when executed by the one or more processors, cause the one or more processors to perform operations comprising:
detecting a reverse condition regarding the vehicle driving in reverse; and
remapping the response of the prime mover in response to the reverse condition such that the response of the prime mover is reduced for a respective position of the accelerator during the reverse condition relative to a forward operation condition of the vehicle, wherein the reduction in the response of the prime mover during the reverse condition provides reduced accelerator sensitivity over a range of travel of the accelerator while the vehicle is driving in reverse to increase accelerator resolution and improve speed control of the vehicle during reverse maneuvers.

11. A non-transitory computer readable medium having computer-executable instructions encoded therein, the instructions, when executed by one or more processors, cause the one or more processors to perform operations comprising:
monitoring a speed of a vehicle;
receiving an indication regarding a deceleration event for the vehicle based on at least one of an accelerator being disengaged by an operator or a brake being engaged by the operator; and
remapping a response of a prime mover of the vehicle from following a first response curve to following a deceleration response curve in response to (i) the deceleration event and (ii) the speed of the vehicle being greater than a speed threshold;
wherein, in response to the accelerator being engaged by the operator following the deceleration event, an output of the prime mover to accelerate the vehicle activates at a relatively lesser amount of depression of the accelerator from a non-depressed state of the accelerator than prior to the deceleration event.

12. The non-transitory computer readable medium of claim 11, wherein the prime mover is configured to provide a negative torque response and a positive torque response with a zero torque operating condition between the negative torque response and the positive torque response, and wherein (a) a first slope of the negative torque response for the deceleration response curve is greater than a second slope of the negative torque response for the first response curve and (b) a first range of the zero torque operating condition for the deceleration response curve is smaller than a second range of the zero torque operating condition for the first response curve, thereby reducing an overall range of the accelerator that is associated with the negative torque response and the zero torque operating condition.

13. The non-transitory computer readable medium of claim 11, wherein the speed threshold is three miles per hour or more.

14. The non-transitory computer readable medium of claim 13, wherein the speed threshold is ten miles per hour or more.

15. The non-transitory computer readable medium of claim 14, wherein the speed threshold is fifteen miles per hour or more.

16. A method comprising:
   receiving an indication regarding a deceleration event for a vehicle;
   remapping a response of a prime mover of the vehicle from following a first response curve to following a deceleration response curve in response to (i) the deceleration event and (ii) a speed of the vehicle being greater than a speed threshold; and
   activating an output of the prime mover to accelerate the vehicle at a relatively lesser amount of depression of an accelerator from a non-depressed state of the accelerator than prior to the deceleration event in response to the accelerator being engaged by an operator following the deceleration event.

17. The method of claim 16, wherein the speed threshold is three miles per hour or more.

18. The method of claim 17, wherein the speed threshold is five miles per hour or more.

19. The method of claim 18, wherein the speed threshold is ten miles per hour or more.

20. The method of claim 16, wherein the prime mover is configured to provide a negative torque response and a positive torque response with a zero torque operating condition between the negative torque response and the positive torque response, and wherein (a) a first slope of the negative torque response for the deceleration response curve is greater than a second slope of the negative torque response for the first response curve and (b) a first range of the zero torque operating condition for the deceleration response curve is smaller than a second range of the zero torque operating condition for the first response curve, thereby reducing an overall range of the accelerator that is associated with the negative torque response and the zero torque operating condition.

* * * * *